United States Patent

Kikuchi

[15] 3,642,105
[45] Feb. 15, 1972

[54] SPEED RESPONSIVE FLUID COUPLING

[72] Inventor: Yasubee Kikuchi, Shuzenjimachi, Japan

[73] Assignee: Usui Kokusai Sangyo Kabushiki Kaisha, Shizuoka Prefecure, Japan

[22] Filed: Oct. 1, 1969

[21] Appl. No.: 862,748

[52] U.S. Cl. .................................. 192/58 B, 192/104 F
[51] Int. Cl. ........................... F16d 35/00, F16d 37/00
[58] Field of Search ............ 192/58, 58 A, 58 B, 58 C, 103 F, 192/103 FA, 104 F

[56] References Cited

UNITED STATES PATENTS

| 3,144,922 | 8/1964 | Weir | 192/103 F |
| 3,217,849 | 11/1965 | Weir | 192/58 A2 X |
| 3,259,220 | 7/1966 | Roper | 192/103 F X |
| 3,403,764 | 10/1968 | Sutaruk | 192/58 A1 |
| 3,498,431 | 3/1970 | Sutaruk | 192/104 F |

*Primary Examiner*—Allan D. Hermann
*Attorney*—Irving M. Weiner

[57] ABSTRACT

This invention is a device wherein a centrifugally operated valve operating automatically to open or close with the fluctuation of the number of revolutions of the driven side is provided for each fluid path connecting a torque transmitting chamber and a fluid pooling chamber which are component parts of a fluid coupling so that the amount of the fluid in the transmitting chamber may be automatically increased or decreased to keep the number of revolutions of the driven side substantially constant. Thus the number of revolutions of the driven side can be kept as constant as possible irrespective of the fluctuation of the load or the fluctuation of the rotation of the driving side.

4 Claims, 11 Drawing Figures

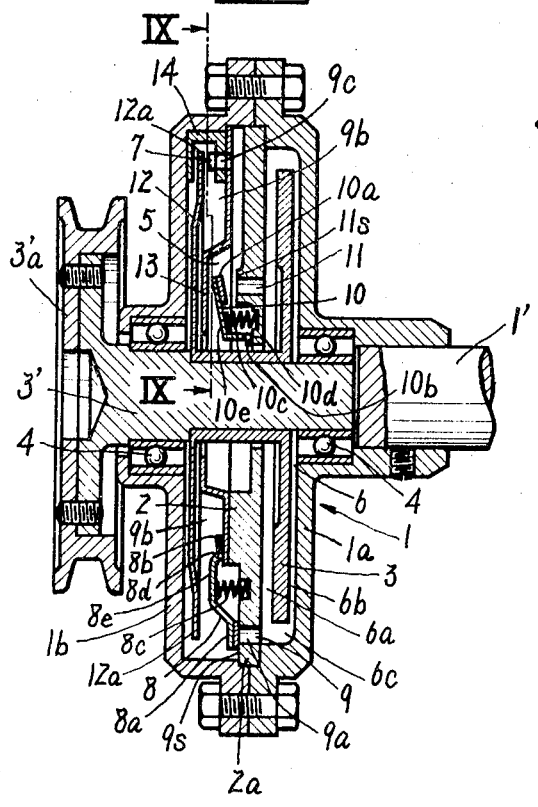
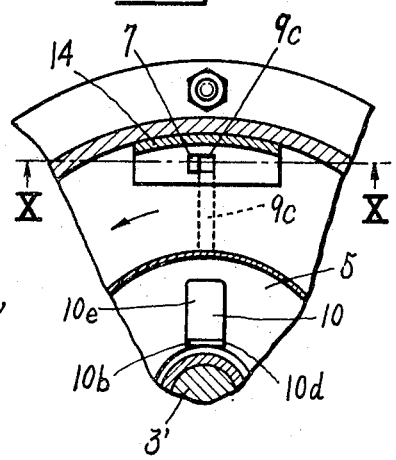
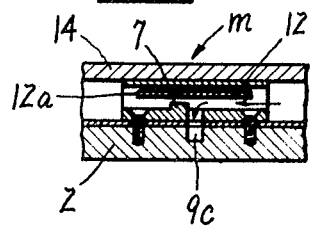
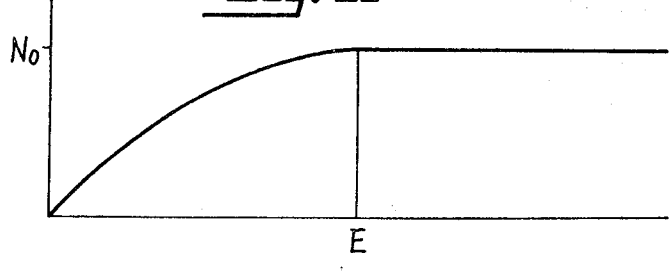

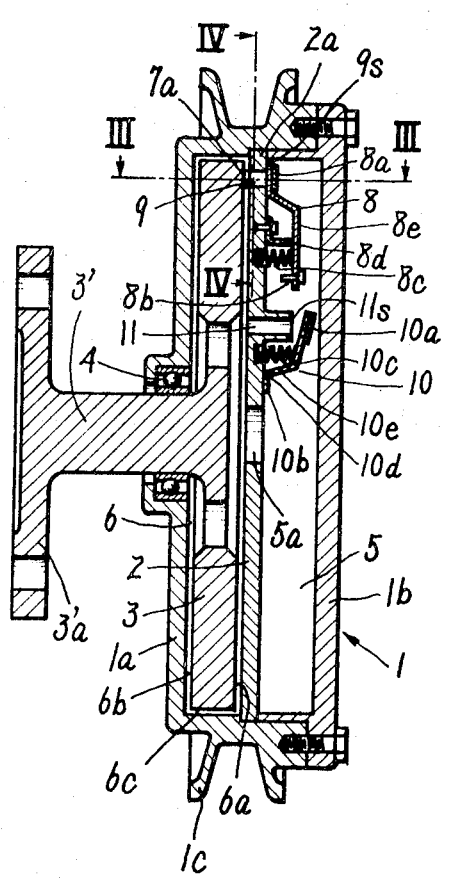
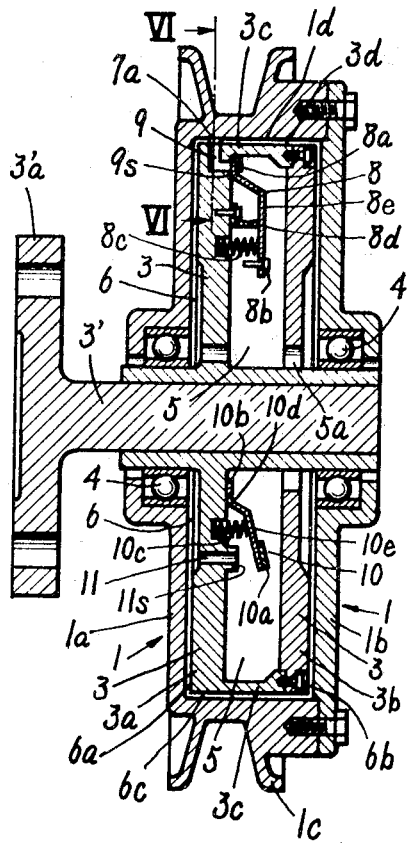
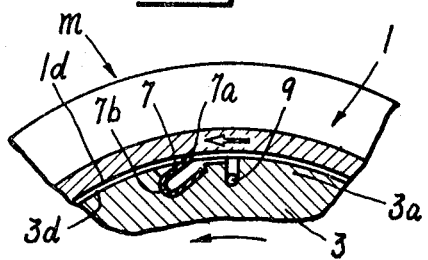

SPEED RESPONSIVE FLUID COUPLING

This invention relates to a fluid coupling keeping the number of revolutions of the driven side constant.

Generally a rotary machine to be driven by an engine is driven by being connected directly or through a belt. Therefore, its number of revolutions increases or decreases with the increase or decrease of the number of revolutions of the engine. However, in most cases, a constant number of revolutions of a dynamo, vacuum pump, air pump, compressor or cooling fan is required irrespective of the fluctuation of the number of revolutions of the engine or the fluctuation of the load.

An object of the present invention is to provide a fluid coupling operation automatically to keep the number of revolutions of the driven side substantially constant irrespective of the fluctuation of the number of revolutions of the driving side or the fluctuation of the load of the driven side.

A further object of the present invention is to obtain at a low cost a fluid coupling which is low in the loss of horsepower and has no wear, trouble and short life by high-speed rotation.

The present invention is a fluid coupling wherein a rotor is fitted in a housing so as to form a torque transmitting chamber (which shall be called merely a transmitting chamber hereinafter), a fluid pooling chamber (which shall be called merely a pooling chamber hereinafter) is provided on the housing side or the rotor side, the side on which it is provided is made a driven side, both chambers are connected with each other through an outflow path from the pooling chamber and an inflow path to the same chamber, a centrifugally operated value is fitted to the outflow path so as to open when the number of revolutions of the driven side becomes less than a specified number of revolutions and to close when it exceeds the specified number of revolutions, another centrifugally operated valve is fitted to the inflow path so as to operate to open or close reversely to the above mentioned valve and further a mechanism (which shall be called merely a fluid pressing-in mechanism hereinafter) for pressing a fluid passing through the path to which is fitted the latter value into the pooling chamber is provided in front (that is, on the transmitting chamber side with respect to the valve here and also hereinafter) or rear (that is, on the pooling chamber side here and also hereinafter) of said valve so that the number of revolutions of the driven side may be kept constant.

In the accompanying drawings;

FIG. 2 is a vertical sectional view on line II—II in FIG. 1;

FIG. 5 is a vertical sectional view showing another embodiment of the fluid coupling according to the present invention;

FIG. 6 is a vertical sectional view on line VI—VI in FIG. 5;

FIG. 7 is an enlarged perspective view of a dam piece in FIG. 5;

FIG. 8 is a vertical sectional view showing still another embodiment of the fluid coupling according to the present invention;

FIG. 9 is a sectional view on line IX—IX in FIG. 8;

FIG. 10 is a sectional view on line X—X in FIG. 9;

FIG. 11 is a characteristic diagram of a fluid coupling according to the present invention.

Figure 1:
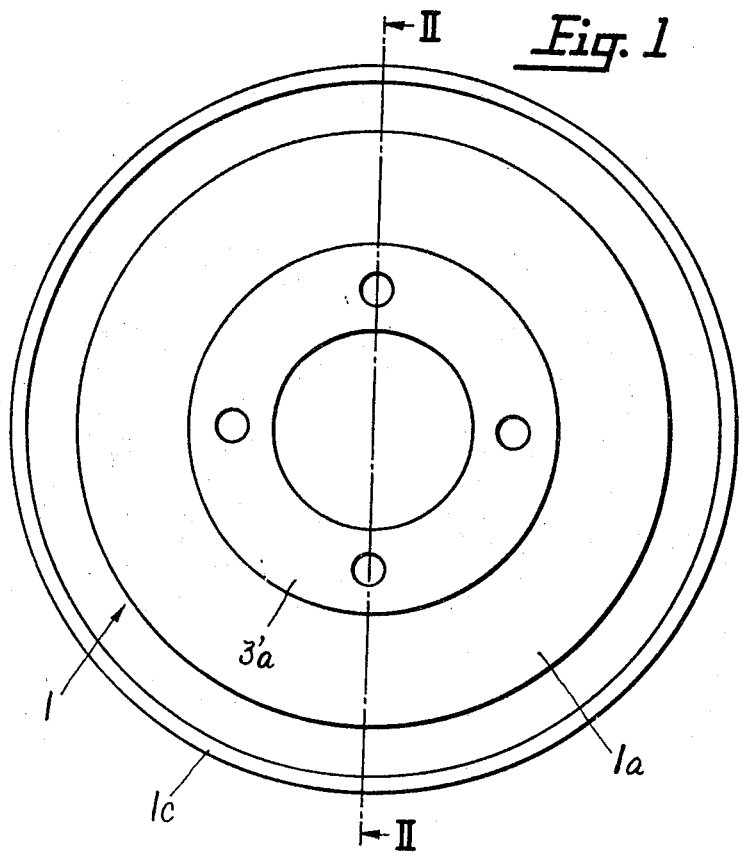
FIG. 1 is an elevation showing an embodiment of the fluid coupling according to the present invention.

An embodiment of the fluid coupling according to the present invention shall be explained with reference to the accompanying drawings.

In the embodiment shown in FIGS. 1, 2, 3 and 4, the pooling chamber is provided on the housing side, the fluid pressing-in mechanism is provided in front of the centrifugally operated valve for the inflow path and the housing side is made a driven side.

That is to say, $1a$ is a casing provided integrally with a V-grooved pulley $1c$, $1b$ is a cover, 1 is a housing enclosed with said casing $1a$ and cover $1b$ and 2 is a partition wall. The interior of the housing 1 is partitioned into a torque transmitting chamber 6 and a fluid pooling chamber 5 with said partition wall 2. $5a$ is a central hole connecting both chambers 5 and 6. 3 is a disk-shaped rotor having a center shaft $3'$ fixed to it, fitted rotatably through ball bearings 4 within the transmitting chamber 6 and directly connected to an engine (not illustrated) with a flange $3'a$ so that the rotor may be a driving side and the housing 1 may be a driven side. The rotor 3 forms small clearances $6a$, $6b$ and $6c$ from the inside surfaces of the transmitting chamber 6. Such high viscosity fluid as silicone oil is interposed in said clearances to transmit a torque. In such case, as the clearances $6a$, $6b$ and $6c$ are constant, the transmitted torque increases or decreases with the increase or decrease of the fluid in the clearances, respectively.

The fluid coupling according to the present invention is provided with a flunction of ingeniously controlling the increase or decrease of such fluid so that, if the rotation on the driven side exceeds a specified number of revolutions, the excess fluid in the transmitting chamber may be transferred into the pooling chamber by the controlling function of a later described inflow path 9, a centrifugally operated valve 8 fitted to said path and a fluid pressing-in mechanism $m$ (FIGS. 3 and 4) provided in front of said valve, a dam 7 of this pressing-in mechanism being omitted in FIG. 2 but being understood from FIGS. 3 and 4, and, if the rotation becomes less than the specified number of revolutions, the fluid may be made to flow out of the pooling chamber 5 into the transmitting chamber 6 and thus the specified number of revolutions may be maintained. The specified number of revolutions is set by the strength of a spring attached to the valve in the case of designing the centrifugally operated valve. The details of this controlling function in this embodiment shall be described in the following.

The inflow path 9 is opened at one end as directed by the torque transmitting surface of the rotor 3 through the peripheral side $2a$ of the partition wall 2 and is provided with a valve seat $9s$ *s for the centrifugally operated valve 8 at the other open end on the pooling chamber 5 side.*

The outflow path 11 is opened at one end on the transmitting chamber 6 side through the partition wall 2 nearer to the axis than the above mentioned inflow path and is provided with a valve seat $11s$ for the centrifugally operated valve 10 at the other open end on the pooling chamber side.

Figure 3:
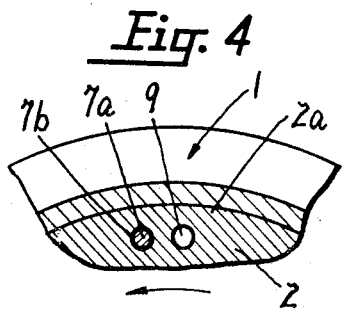
FIG. 3 is an enlarged vertical sectional view on line III—III in FIG. 2.
Figure 4:
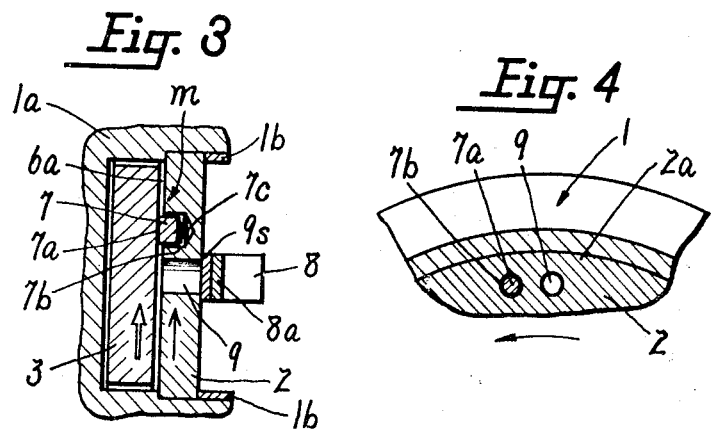
FIG. 4 is an enlarged vertical sectional view on IV—IV in FIG. 2.

As shown as enlarged in FIGS. 3 and 4, the fluid pressing-in mechanism $m$ forming a part of FIG. 2 consists of the rotor 3, the inflow path 9 provided in the partition wall 2 and a dam 7 to collide with the fluid tending to overflow the inlet of this inflow path during the dividing. Further, this dam 7 consists of a dam piece $7a$ to collide with the fluid, a hole $7b$ to fit said piece and a compression coil spring $7c$ to bear the dam piece in the bottom part of said hole. In said FIGS. 3 and 4, the single-line arrow indicates the direction of the rotation of the housing side, the double-line arrow indicates the direction of the rotation of the rotor side and the rotor is shown to be transmitting a torque to the housing side by a fluid connection. In the illustrated case, the inflow path 9 is closed by the later mentioned centrifugally operated valve 8. But, if it is opened when the rotor 3 is rotating, the fluid having collided with the dam 7 will be pressed into the pooling chamber 5 through the inlet of the inflow path 9 by the pressure produced by the collision.

The dam 7 mentioned in this embodiment is nothing but an example. In the later described embodiments, respectively different ones are enumerated. The pressing-in mechanism $m$ to be used for a fluid coupling is already publicly known.

Now, the centrifugally operated valves 8 and 10 shall be explained. These valves are fitted to the outflow path 11 and inflow path 9 on the other side of the transmitting chamber 6 so as to control the movement of the fluid. The centrifugally operated valve 10 for the outflow path 11 is provided so as to open when the rotation of the housing 1 side (driven side) becomes less than the specified number of revolutions and to close when the rotation exceeds the specified number of revolutions. The other centrifugally operated valve 8 for the inflow path 9 is provided so as to operate to open or close reversely to the valve 10 for the outflow path 11. Such centrifugally operated valves are designed in various manners. The illustrated ones 8 and 10 are respectively provided with valve bodies 8a and 10a at the ends of levers 8e and 10e, stoppers 8b and 10b at the other ends and coil springs 8c and 10c fitted so as to swing around pivots 8d and 10d as respective centers.

When the valve bodies 8a and 10a provided at the free ends of the respective levers are rotated around the center shaft 3', they will operate in planes vertical to thepartition wall 2 with the pivots 8d and 10d as swinging axes due to a pendulum action. It is to utilize this motion that the respective valve seats 9s and 11s of the inflow port 9 and outflow port 11 are provided on levels different from those of the pivots 8d and 10d corresponding to said valve seats as evident from the drawings. the partition Therefore, it is understood that, as the valve body 8a is provided nearer to the partition wall 2 than the pivot 8d, a centrifugal force will act on the valve body so as to open the inflow port 9. Therefore, as such centrifugal force will be applied to the valve body 8a in addition to the fluid pressing-in force applied by the pressing-in mechanism m, the spring 8c is so selected as to be of a spring force which will press the valve body onto the valve seat against such force not to open the valve until the rotation of the housing side (driven side) exceeds the specified number of revolutions but will act to open the valve when it exceeds the specified number of revolutions. Further, for the spring to be fitted in the illustrated position is used a compression coil spring.

The other valve body 10a has the pivot 10d on the partition wall surface and is provided with a valve seat in a position away from this surface. Therefore, the centrifugal force produced by the rotation of the housing side will act on the valve body 10a so as to close the outflow port 11. Therefore, the spring 10c to be attached to this valve 10 is so selected as to be of a spring force acting to open the outflow path 11 when the rotation of the housing side (driven side) is less than the specified number of revolutions and to close it when the rotation exceeds the specified number of revolutions. Further, the spring 10c fitted in the illustrated position is a compression coil spring as in the case of the above mentioned valve 8.

In the illustrated case, these springs 8c and 10c are both compression coil springs. However, the spring fitting positions can be properly selected. Depending on the positions, tension springs may be also used.

As understood from the above explanation, the state of the torque transmission by the fluid coupling exemplified in FIG. 2 shows a state when the rotation of the housing 1 side (driven side) is less than the specified number of revolutions. That is to say, in this state, in order that the driven side may recover the specified number of revolutions, the outflow path 11 is opened and the inflow path 9 is closed so that the fluid in the transmitting chamber 6 may be increased and the fluid connection may be strengthened.

If the rotation of the housing side exceeds the specified number of revolutions, the illustrated opened or closed state will be reversed, the fluid in the transmitting chamber will be pressed into the pooling chamber 5 through the inflow path 9 by the pressing-in mechanism m and the rise of the number of revolutions will be prevented. Thus the rotation of the driven side will be maintained at the specified number of revolutions.

FIG. 11 is a characteristic diagram of the operations and effects obtained with the fluid coupling according to the present invention. It is shown that the number of revolutions of the driven side will rise with the increasing of the number of revolutions of the driving side until the number of revolutions $No$ specified at the at the time of the design is reached but will stop rising when the number of revolutions $No$ is reached, that, when the number of revolutions of the driving side becomes more than $E$, even if the number of revolutions of the prime mover varies, the number of revolutions $No$ will be maintained and that, even if the load fluctuates and the number of revolutions of the driven side increases or decreases from $No$, the rotation will immediately return to $No$ and will be maintained at a fixed rotation.

In the fluid coupling of the embodiment shown in FIGS. 5, 6 and 7, a fluid pooling chamber is provided within a rotor, the rotor side is made a driven side and the housing side is made a driving side. When the present invention is worked by this structure, there will be an advantage that, even if the diameter of the rotor is reduced, the torque transmitting area will be able to be secured by the width of the cylindrical wall.

Now, it shall be explained with reference to the drawings. 1a is a casing provided integrally with a V-grooved pulley 1c on the inlet side, 1b is its cover, 1 is a housing enclosed with the casing 1a and cover 1b and 3 is a hollow rotor having a center shaft 3' fixed to it, fitted in the housing 1 through bearings 4. A torque transmitting chamber 6 is formed in the housing. The hollow rotor 3 is enclosed with sidewalls 3a and 3b and a cylindrical wall 3c. Its inside hollow part forms a fluid pooling chamber 5. 3'a is a flange to directly connect the center shaft 3' to a rotary shaft (not illustrated) on the load side.

11 is an outflow path to move the fluid in the pooling chamber 5 into the transmitting chamber 6 and provided in the sidewall part 3a of the hollow rotor 3. 9 is an inflow path provided in the cylindrical wall 3c of the hollow rotor so as to move the fluid reversely to the outflow path 11. Thus the transmitting chamber 6 and the pooling chamber 5 are connected with each other through the inflow path 9 and outflow path 11.

10 is a centrifugally operated valve fitted on the valve seat 11s side of the outflow path 11. 8 is a centrifugally operated valve fitted on the valve seat 9s side of the inflow path 9. The valve 10 opens when the rotation of the rotor 3 side (driven side) becomes less than a specified number of revolutions and closes when it exceeds the specified number of revolutions. The valve 8 opens and closes reversely to the valve 10. The centrifugally operated valves 8 and 10 have respectively the same functions as of those illustrated in FIG. 2, the same numerals therein represent the same respective parts and both operations and effects are the same in them.

It is the same as in FIG. 2 that a fluid flows into small clearances 6a, 6b and 6c between the inside surface of the housing 1 and the outside surface of the hollow rotor 3 so that a torque may be transmitted. In this embodiment, as compared with the one exemplified in FIG. 2, the pooling chamber is provided not on the housing side but within the rotor. Therefore, the inside peripheral surface 1d of the housing 1 and the cylindrical outer peripheral surface 3d of the hollow rotor opposed to it are made larger so that the torque transmitting surface may be larger.

Further, as shown in FIGS. 6 and 7, the fluid pressing-in mechanism m in this embodiment consists of the inside peripheral surface 1d of the housing 1, the inflow path 9 provided in the cylindrical wall 3c of the hollow rotor and a dam 7 to collide with the fluid tending to overflow the inlet of the inflow path during the driving. The dam 7 consists of a U-shaped dam piece 7a to collide with the fluid and a recess 7b to fit said piece. Its function is the same as of the one exemplified in FIG. 2.

As understood from the above explanation, the state of the torque transmission of the fluid coupling exemplified in FIG. 5 is different from that of the embodiment illustrated in FIG. 2 in respect that the rotor side is a driven side but is the same in the opening and closing of the centrifugally operated valve. In FIG. 6, the single-line arrow indicates the direction of the rotation of the rotor 3 side (driven side), the double-line arrow indicates the direction of the rotation of the housing 1 side (driving side) and it is shown that the rotor side is transmitting a torque to the housing side.

The characteristic diagram obtained by the embodiment exemplified in FIG. 5 is the same as the characteristic diagram obtained by the one in FIG. 2.

The fluid coupling of the embodiment shown in FIGS. 8, 9 and 10 is the same as the one shown in FIG. 2 in respect that one side of the partition wall is made the sidewall of the torque transmitting chamber and the other side is made the sidewall of the fluid pooling chamber but is different in respect that the fluid pooling chamber is provided on the peripheral side of the shaft on the other side of the torque transmitting chamber, the inflow path is longer than in FIG. 2 and the fluid pressing-in mechanism is provided in a position independent of the rotor within the torque transmitting chamber.

According to such structure, the precision of the operation of the valve is higher and a controlling function which is higher in the precision than any of the above-mentioned embodiments is obtained. It shall be explained with reference to the drawings in the following.

1 is a housing enclosed with a casing 1a and its cover 1b. 1' is a center shaft of said housing connected with the load side. 2 is a partition wall partitioning the interior of the casing into a first chamber 6 and second chamber 9b. In the first chamber 6, a disk-shaped rotor 3 having the center shaft 3' is rotatably fitted through bearings 4 and small clearances 6a and 6b and a peripheral clearance 6c are provided to form a torque transmitting chamber 6 (which is represented by the numeral 6 of the first chamber here and also hereinafter). The rotor 3 is connected to a prime mover (not illustrated) by a pulley 3'a through the center shaft 3' to form a driving side. 5 is a fluid pooling chamber formed near the axis by providing an expanded part 13 within the second chamber 9b using the second chamber 9b side of the partition wall 2 as an inner wall.

9a is an inlet port through the peripheral side 2a of the partition wall 2. 9c is a pressing-in port for moving the fluid into the pooling chamber 5. These inlet port 9a and pressing-in port 9c connect with each other through the hollow 9b of the second chamber (the hollow is represented by the numeral 9b of the second chamber here and also hereinafter) to form an inflow path 9 for moving the fluid from the transmitting chamber 6 to the pooling chamber 5. The inlet port 9a is provided with a valve seat 9s at the open end on the second chamber side and with a centrifugally operated valve 8 on side valve seat 9s side. The pressing-in port 9c opens through a small clearance against the peripheral edge 12a of a rotary disk 12 within the second chamber 9b.

The fluid pressing-in mechanism m of this embodiment consists of the disk 12 fixed to the center shaft 3' and rotating within the second chamber as shown in FIG. 8 and further the pressing-in port 9c opening adjacently to the peripheral edge 12a of said rotary disk, the dam 7 to collide with the fluid tending to overflow the inlet of this pressing-in port during the driving and a distance piece 14 forming a small clearance from the peripheral edge 12a of the rotary disk 12 as shown in FIGS. 9 and 10. In this embodiment, the distance piece 14 is provided because the second chamber is not a torque transmitting chamber but has a large clearance from the peripheral edge 12a of the rotary disk. As shown by the sectioned view in FIG. 10, the operation of the pressing-in mechanism of this embodiment (FIG. 8) is not different from that of any of the above-mentioned embodiments. That is to say, the arrow in FIG. 9 indicates the direction of the rotation of the rotary disk 12 and the arrow in FIG. 10 shows that the fluid advancing as pulled by this rotary disk 12 collides with the dam 7 and is pressed into the pressing-in port 9c.

The centrifugally operated valve in this embodiment (FIG. 8) has the same structure and function as are exemplified in FIG. 2 and the same numerals represent the same corresponding parts. The only difference to be mentioned is that, for the centrifugally operated valve 8 provided for the inflow path 9, a compression coil spring is used in the preceding embodiment in FIG. 2 but a tension coil spring 8c is used in this embodiment. As described above, this is a difference in the design to be selected depending on the shape of the peripheral side.

The illustrated state of this embodiment (FIG. 8) is the same as the above-mentioned illustrated state (FIG. 2) and shows that the pooling chamber 5 side (driven side) rotates in the direction indicated by the arrow in FIG. 9, the centrifugally operated valve 10 is opened until a specified number of revolutions is reached and the other valve 8 is closed so that the fluid may flow into the transmitting chamber (first chamber) 6 from the pooling chamber to increase the amount of the fluid in the transmitting chamber (first chamber) 6. When the rotation of the driven side (housing 1 side) exceeds the specified number of revolution, the opening and closing of the centrifugally operated valves 8 and 10 will be reversed, the fluid in the transmitting chamber (first chamber) 6 will flow into the second chamber 9b side until the rotation of the driven side reaches the specified number of revolutions through the inlet port 9a of the inflow path 9 from the peripheral clearance 6c of the first chamber and will be immediately pressed into the pooling chamber 5 by the pressing-in mechanism provided within the second chamber 9b. In such case, the transmission of the torque in the part of the pressing-in mechanism m is considered but the part contributing to this transmission is only a small area on the distance piece 14, the inflow is immediately drawn up by the pressing-in mechanism m without staying in the second chamber 9b and therefore the transmitting effect in the second chamber is substantially negligible.

The remarkable effect obtained by the structure of this embodiment is that, as the valve body 8a of the centrifugally operated valve provided for the inflow path 9 can be operated to open or close without being subjected to the fluid pressing-in force produced by the pressing-in mechanism m, a fluid coupling developing a controlling function high in the precision can be obtained.

Each of the above embodiments is of a structure wherein the center shaft of the rotor 3 is borne by the ball bearings 4. However, if the small clearances 6a, and 6c formed by the inside surface of the torque transmitting chamber 6 and the outside surface of the rotor 3 as opposed to each other to transmit a torque are so made as to form an oil film required for sliding, these inside surface and outside surface can be made to have a bearing function and therefore said ball bearings can be replaced merely with oil seals in working the invention.

What is claimed is:

1. A fluid coupling comprising a rotor having a center shaft fixed to it, a housing forming a transmitting chamber with said rotor fitted in it, a pooling chamber in one of said rotor or housing, an inflow path for moving a fluid from said transmitting chamber to said pooling chamber, an outflow path for moving the fluid reversely, centrifugally operated valves provided respectively for these paths and a pressing-in mechanism for pressing the fluid into said pooling chamber, the rotor or housing provided with said pooling chamber being made a driven side, said centrifugally operated valve provided for the outflow path being so set as to open when the rotation of the driven side becomes less than a specified number of revolutions and to close when it exceeds the specified number of revolutions and said centrifugally operated valves for the inflow path being so set as to operate to open and close reversely to the above-mentioned valve, whereby the fluid in the transmitting chamber increases when the rotation of the driven side becomes less than the specified number of revolutions but decreases when it becomes more than the specified number of revolutions so that the number of revolutions of the driven side may be kept constant.

2. A fluid coupling wherein the interior of a housing enclosed with a casing and its cover is partitioned into a torque transmitting chamber and a fluid pooling chamber, a disk-shaped rotor having a center shaft fixed to it is rotatably fitted in said torque transmitting chamber, an inflow path for moving a fluid from the transmitting chamber to the pooling chamber is provided in the peripheral side of the partition wall and an outflow path for moving the fluid reversely is provided in said partition wall to connect both chambers, a centrifugally operated valve which opens when the rotation of the housing side becomes less than a specified number of revolutions but closes when it exceeds the specified number of revolutions is fitted to the outflow path, a centrifugally operated valve which operates to open or close reversely to the above-mentioned valve is fitted to the inflow path, further a pressing-in mechanism for pressing the fluid into the pooling chamber through the inflow path is provided between the adjacent surfaces of the partition wall and the rotor on the torque transmitting chamber side, the housing side is made a driven side and the rotor side is made a driving side.

3. A fluid coupling wherein a hollow rotor having a center shaft fixed to it is rotatably fitted in a housing enclosed with a casing and its cover, the interior of the housing is made a torque transmitting chamber, the interior of the hollow rotor is made a fluid pooling chamber, an outflow path for moving the fluid from the pooling chamber to the transmitting chamber is provided in the sidewall part of the hollow rotor and an inflow path for reversely moving the rotor is provided in the cylindrical wall part of the same rotor to connect both chambers, a centrifugally operated valve which opens when the rotation of the rotor side becomes less than a specified number of revolutions but closes when it exceeds the specified number of revolutions in fitted to the outflow path, a centrifugally operated valve which operates to open or close reversely to the above mentioned valve is fitted to the inflow path, further a pressing-in mechanism for pressing the fluid into the pooling chamber through the inflow path is provided between the adjacent surfaces of the inside peripheral surface of the housing and the outer peripheral surface of the cylindrical part of the hollow rotor on the torque transmitting chamber side, the housing side is made a driving side and the hollow rotor side is made a driven side.

4. A fluid coupling wherein the interior of a housing enclosed with a casing and its cover is partitioned with a partition wall into a first chamber and second chamber, a disk-shaped rotor having a center shaft fixed to it is rotatably fitted in the first chamber, said first chamber is made a torque transmitting chamber, a fluid pooling chamber is formed as expanded near to the axis on the second chamber side of the partition wall, an inflow path for moving the fluid from the transmitting chamber to said pooling chamber is provided through the peripheral edge of the partition wall and an outflow path for reversely moving the fluid is provided through the part of the same partition wall forming the sidewall of the pooling chamber to connect both chambers, a centrifugally operated valve which opens when the rotation of the housing side becomes less than a specified number of revolutions but closes when it exceeds the specified number of revolutions is fitted to the outflow path, a centrifugally operated valve which operates to open or close reversely to the above-mentioned valve is fitted to the inlet port of the inflow path, further a fluid pressing-in mechanism is provided between the peripheral edge of the rotary disk in the above-mentioned second chamber and the inlet of the pressing-in port of the pooling chamber, the housing side is made a driven side and the rotor side is made a driving side.

\* \* \* \* \*